(12) United States Patent
Jiang et al.

(10) Patent No.: US 9,849,523 B2
(45) Date of Patent: Dec. 26, 2017

(54) ROTARY CUTTING TOOL WITH ACCURATE POSITIONING

(71) Applicant: ZHUZHOU CEMENTED CARBIDE CUTTING TOOLS CO., LTD., Zhuzhou, Hunan (CN)

(72) Inventors: Aisheng Jiang, Zhuzhou (CN); Shequan Wang, Zhuzhou (CN); Aimin Tang, Zhuzhou (CN); Min Liu, Zhuzhou (CN); Lin Chen, Zhuzhou (CN); Wei Yi, Zhuzhou (CN)

(73) Assignee: ZHUZHOU CEMENTED CARBIDE CUTTING TOOLS CO., LTD., Zhuzhou, Hunan (CN)

( * ) Notice: Subject to any disclaimer, the term of this patent is extended or adjusted under 35 U.S.C. 154(b) by 172 days.

(21) Appl. No.: 14/653,267

(22) PCT Filed: Sep. 30, 2013

(86) PCT No.: PCT/CN2013/084712
§ 371 (c)(1),
(2) Date: Jun. 18, 2015

(87) PCT Pub. No.: WO2014/101516
PCT Pub. Date: Jul. 3, 2014

(65) Prior Publication Data
US 2015/0328697 A1 Nov. 19, 2015

(30) Foreign Application Priority Data

Dec. 28, 2012 (CN) .......................... 2012 1 0580698

(51) Int. Cl.
*B23C 5/22* (2006.01)
*B23C 5/24* (2006.01)

(52) U.S. Cl.
CPC .......... *B23C 5/2226* (2013.01); *B23C 5/2468* (2013.01); *B23C 2200/161* (2013.01);
(Continued)

(58) Field of Classification Search
CPC .......... B23C 2210/168; B23C 2260/80; B23C 2200/161; B23C 5/2226; B23C 5/2468;
(Continued)

(56) References Cited

U.S. PATENT DOCUMENTS 2,805,468 A * 9/1957 Williams ............... B23C 5/2455
407/41
5,529,439 A * 6/1996 Werner .................. B23C 5/241
407/39
(Continued)

*Primary Examiner* — Daniel Howell
*Assistant Examiner* — Nicole N Ramos
(74) *Attorney, Agent, or Firm* — Raymond Y. Chan; David and Raymond Patent Firm

(57) ABSTRACT

A rotary cutting tool includes a rotary tool body, a blade clamp, a cutting insert, a clamp fastener, and an insert fastener, wherein the rotary tool body has an insert pocket to define a bottom positioning face, a first lateral positioning face and a second lateral positioning face. The cutting insert is affixed to the blade clamp via the insert fastener. The first lateral positioning face is orientated opposite to a side cutting edge of the cutting insert. The blade clamp is slid into the insert pocket in an axial direction of the rotary tool body, wherein the blade clamp is coupled by the first and second lateral positioning faces in an interference clamping manner and is retained at the rotary tool body by the clamp fastener. The present invention has the advantages of strong radial impact resistance, high positioning accuracy, high safety concern and long service life.

20 Claims, 13 Drawing Sheets

(52) U.S. Cl.
CPC .... *B23C 2210/168* (2013.01); *B23C 2260/80* (2013.01); *Y10T 407/1932* (2015.01)

(58) Field of Classification Search
CPC ............... B23C 5/2465; Y10T 407/192; Y10T 407/1932; Y10T 407/1936; Y10T 407/227; Y10T 407/2272; Y10T 407/2274; Y10T 407/2282
See application file for complete search history.

(56) References Cited

U.S. PATENT DOCUMENTS

| | | | | |
|---|---|---|---|---|
| 5,735,649 | A * | 4/1998 | Boscarino | B23B 29/03428 407/39 |
| 6,280,122 | B1 * | 8/2001 | Qvarth | B23C 5/207 407/36 |
| 8,475,087 | B2 * | 7/2013 | Wihlborg | B23C 5/08 407/46 |
| 2004/0131432 | A1 * | 7/2004 | Riviere | B23C 5/08 407/40 |
| 2005/0135884 | A1 * | 6/2005 | Lundvall | B23B 27/145 407/113 |
| 2007/0274792 | A1 * | 11/2007 | Pantzar | B23C 5/2221 407/66 |
| 2012/0014758 | A1 * | 1/2012 | Hall | B23C 5/08 407/43 |

* cited by examiner

ROTARY CUTTING TOOL WITH ACCURATE POSITIONING

CROSS REFERENCE OF RELATED APPLICATION

This is a non-provisional application that claims priority to international application number PCT/CN2013/084712, international filing date Sep. 30, 2013, which claims priority to Chinese application 20120580698.X, filing date Dec. 28, 2012.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a tool, and more particular to a rotary cutting tool with a positioning arrangement, which has the advantages of strong radial impact resistance, high positioning accuracy, high safety concern and long service life.

Description of Related Arts

As shown in FIGS. 1 and 2, a conventional rotary cutting tool comprises a rotary cutting body 1, a clamp 2, a cutting insert 3, a clamp fastener 4, and an insert fastener 5. The rotary cutting body 1 has at least an insert pocket 11, wherein the cutting insert 3 is affixed at the clamp 2 by the insert fastener 5, such that the cutting insert 3 and the clamp 2 together are affixed at the insert pocket 11. In particular, the clamp fastener 4 is extended through a hole on the rotary cutting body 1 to couple at the clamp 2 via a threaded engagement structure, such that the threaded portion of the clamp fastener 4 is engaged with the threaded portion of the clamp 2 (which is made of steel) without directly engaging with the threaded portion of the rotary cutting body 1. Even though the threaded portion of the rotary cutting body 1 is damaged, such as due to wear and tear, the cutting insert 3 can be kept in good condition so as to prolong the service life span of the cutting insert 3. However, during the cutting process, the cutting insert 3 will generate a cutting force F1 at the outer lateral side of the cutting insert 3. On the other hand, the supporting point O is formed at a connection between the clamp 2 and the outer lateral side of the rotary cutting body 1, wherein the supporting point O is a point to support the clamp 2 within the insert pocket 11, such that a distance between the cutting force F1 and the supporting point O is formed. As a result, the rotary cutting body 1 is easily distorted or cracked at the supporting point O. It is because a torque is generated in response to the cutting force F1 and the supporting point O, such that the clamp fastener 4 must provide enough clamping force F2 to against the torque. It is worth mentioning that the engagement between the rotary cutting body 1 and the clamp 2 is secured only by the clamp fastener 4. When the cutting force F1 increases, the clamping force provided by the clamp fastener 4 must be increased. Since the hardness and the stiffness of the rotary cutting body 1 are low, the distortion and crack will happen on the rotary cutting body 1. In addition, the clamp 2 and the cutting insert 3 will be easily loosen or displaced, such that the cutting precision of the cutting insert 3 will be reduced. In severe cases, the cutting insert 3 can be deformed or even broken due to the excessive force during the cutting process, which will cause serious problems.

SUMMARY OF THE PRESENT INVENTION

The invention is advantageous in that it provides a rotary cutting tool, which has the advantages of strong radial impact resistance, high positioning accuracy, high safety concern and long service life.

Additional advantages and features of the invention will become apparent from the description which follows, and may be realized by means of the instrumentalities and combinations particular point out in the appended claims.

According to the present invention, the foregoing and other objects and advantages are attained by a rotary cutting tool which comprises a rotary tool body, a blade clamp, a cutting insert, a clamp fastener, and an insert fastener, wherein the rotary tool body has an insert pocket to define a bottom positioning face, a first lateral positioning face and a second lateral positioning face. The cutting insert is affixed to the blade clamp via the insert fastener. The first lateral positioning face is orientated opposite and parallel to an outer lateral cutting edge of the cutting insert. The blade clamp is slid into the insert pocket in an axial direction of the rotary tool body, wherein the blade clamp is coupled by the first and second lateral positioning faces in an interference fitting (clamping) manner and is retained at the rotary tool body by the clamp fastener.

Accordingly, the rotary cutting body further has at least a second guiding slot indently formed on the first lateral positioning face, wherein the blade clamp further comprises at least a second guiding element integrally protruded from a first lateral side of the blade clamp to engage with the second guiding slot, wherein the second guiding element and the second guiding slot are extended parallel to an axial direction of the rotary cutting body.

The second guiding slot, having a tapered shape, defines a second slot bottom surface and two second slot lateral surfaces extended therefrom, wherein the blade clamp is retained the insert pocket between the bottom positioning face and the second slot lateral surface in an interference fitting manner.

The second guiding element, having a corresponding tapered shape, defines a second guiding peak surface and two second guiding lateral surfaces extended therefrom. A third guiding angle $\beta$ is defined between the two second slot lateral surfaces of the second guiding slot. A fourth guiding angle $\beta_1$ is defined between the second guiding lateral surfaces of the second guiding element. Accordingly, $30° \leq \beta \leq 160°$, $30° \leq \beta_1 \leq 160°$, and $0.5° \leq \beta_1 - \beta \leq 3°$.

When the second guiding element is engaged with the second guiding slot, the second guiding peak surface of the second guiding element is tightly biased against the second slot bottom surface of the second guiding slot that no space is formed therebetween.

The rotary cutting body further has at least a first guiding slot indently formed on the bottom positioning face, wherein the blade clamp further comprises at least a first guiding element integrally protruded from a bottom side of the blade clamp to engage with the first guiding slot, wherein the first guiding element and the first guiding slot are extended parallel to an axial direction of the rotary cutting body.

The first guiding slot, having a tapered shape, defines a first slot bottom surface and two first slot lateral surfaces extended therefrom, wherein the blade clamp is retained the insert pocket between the first lateral positioning face and the first slot lateral surface in an interference fitting manner.

The first guiding element, having a corresponding tapered shape, defines a first guiding peak surface and two first guiding lateral surfaces extended therefrom. A first guiding angle $\alpha$ is defined between the two first slot lateral surfaces of the first guiding slot. A second guiding angle $\alpha 1$ is defined between the first guiding lateral surfaces of the first guiding element. Accordingly, $30° \leq \alpha \leq 160°$, $30° \leq \alpha 1 \leq 160°$, and $0.5° \leq \alpha 1 - \alpha \leq 3°$.

When the first guiding element is engaged with the first guiding slot, the first guiding peak surface of the first guiding element is tightly biased against the first slot bottom surface of the first guiding slot that no space is formed therebetween.

The rotary cutting body further has at least a first guiding slot indently formed on the bottom positioning face, wherein the blade clamp further comprises at least a first guiding element integrally protruded from a bottom side of the blade clamp to engage with the first guiding slot, wherein the first guiding element and the first guiding slot are extended parallel to an axial direction of the rotary cutting body. The rotary cutting body further has at least a second guiding slot indently formed on the first lateral positioning face, wherein the blade clamp further comprises at least a second guiding element integrally protruded from a first lateral side of the blade clamp to engage with the second guiding slot, wherein the second guiding element and the second guiding slot are extended parallel to an axial direction of the rotary cutting body.

The first guiding slot, having a tapered shape, defines a first slot bottom surface and two first slot lateral surfaces extended therefrom. The second guiding slot, having a tapered shape, defines a second slot bottom surface and two second slot lateral surfaces extended therefrom, wherein the blade clamp is retained the insert pocket between the first slot lateral surface and the second slot lateral surface in an interference fitting manner.

The first guiding element, having a corresponding tapered shape, defines a first guiding peak surface and two first guiding lateral surfaces extended therefrom. A first guiding angle $\alpha$ is defined between the two first slot lateral surfaces of the first guiding slot. A second guiding angle $\alpha 1$ is defined between the first guiding lateral surfaces of the first guiding element. Accordingly, $30° \leq \alpha \leq 160°$, $30° \leq \alpha 1 \leq 160°$, and $0.5° \leq \alpha 1 - \alpha \leq 3°$. The second guiding element, having a corresponding tapered shape, defines a second guiding peak surface and two second guiding lateral surfaces extended therefrom. A third guiding angle $\beta$ is defined between the two second slot lateral surfaces of the second guiding slot. A fourth guiding angle $\beta 1$ is defined between the second guiding lateral surfaces of the second guiding element. Accordingly, $30° \leq \beta \leq 160°$, $30° \leq \beta 1 \leq 160°$, and $0.5° \leq \beta 1 - \beta \leq 3°$.

When the first guiding element is engaged with the first guiding slot, the first guiding peak surface of the first guiding element is tightly biased against the first slot bottom surface of the first guiding slot that no space is formed therebetween. When the second guiding element is engaged with the second guiding slot, the second guiding peak surface of the second guiding element is tightly biased against the second slot bottom surface of the second guiding slot that no space is formed therebetween.

The rotary cutting body further has at least a third guiding slot indently formed on the second lateral positioning face, wherein the blade clamp further comprises at least a third guiding element integrally protruded from a second lateral side of the blade clamp to engage with the third guiding slot. The third guiding slot, having a tapered shape, defines a third slot bottom surface and two third slot lateral surfaces extended therefrom. The third guiding element, having a corresponding tapered shape, defines a third guiding peak surface and two third guiding lateral surfaces extended therefrom. A fifth guiding angle $\gamma$ is defined between the two third slot lateral surfaces of the third guiding slot. A sixth guiding angle $\gamma 1$ is defined between the third guiding lateral surfaces of the third guiding element. Accordingly, $30° \leq \gamma \leq 160°$, $30° \leq \gamma 1 \leq 160°$, and $0.5° \leq \gamma 1 - \gamma \leq 3°$.

When the third guiding element is engaged with the third guiding slot, the third guiding peak surface of the third guiding element is tightly biased against the third slot bottom surface of the third guiding slot that no space is formed therebetween.

Another advantage of the invention is that the blade clamp is securely held by the first lateral positioning face and the bottom positioning face of the insert pocket, and is also securely held by the clamp fastener, such that the two retention structures are combined to suspendly retain the blade clamp at the insert pocket, so as to enable the blade clamp to be only moved in the insert pocket at an axial movement. Accordingly, such axial movement of the blade clamp can greatly enhance the radial impact resistance of the rotary cutting tool. In particular, most of the radial impact can be transferred to the first lateral positioning face and the bottom positioning face of the insert pocket, such that the radial impart will be minimized at the clamp fastener, so as to prevent the distortion of the clamp fastener and the connection between the clamp fastener and the rotary cutting body. As a result, the cutting precision of the cutting insert will be highly enhanced and the safety operation of the cutting insert will be significantly ensured. In addition, through the retention positioning configuration, the blade clamp can generate a relatively large torque to restrict any unwanted rotational movement of the blade clamp at the insert pocket, so as to ensure the surface contact between the blade clamp and the insert pocket. Therefore, the load at the outer connection edge between the blade clamp and the insert pocket can be greatly reduced to prevent the distortion or crack of the insert pocket at the outer connection edge, so as to prolong the service life span of the rotary cutting tool.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
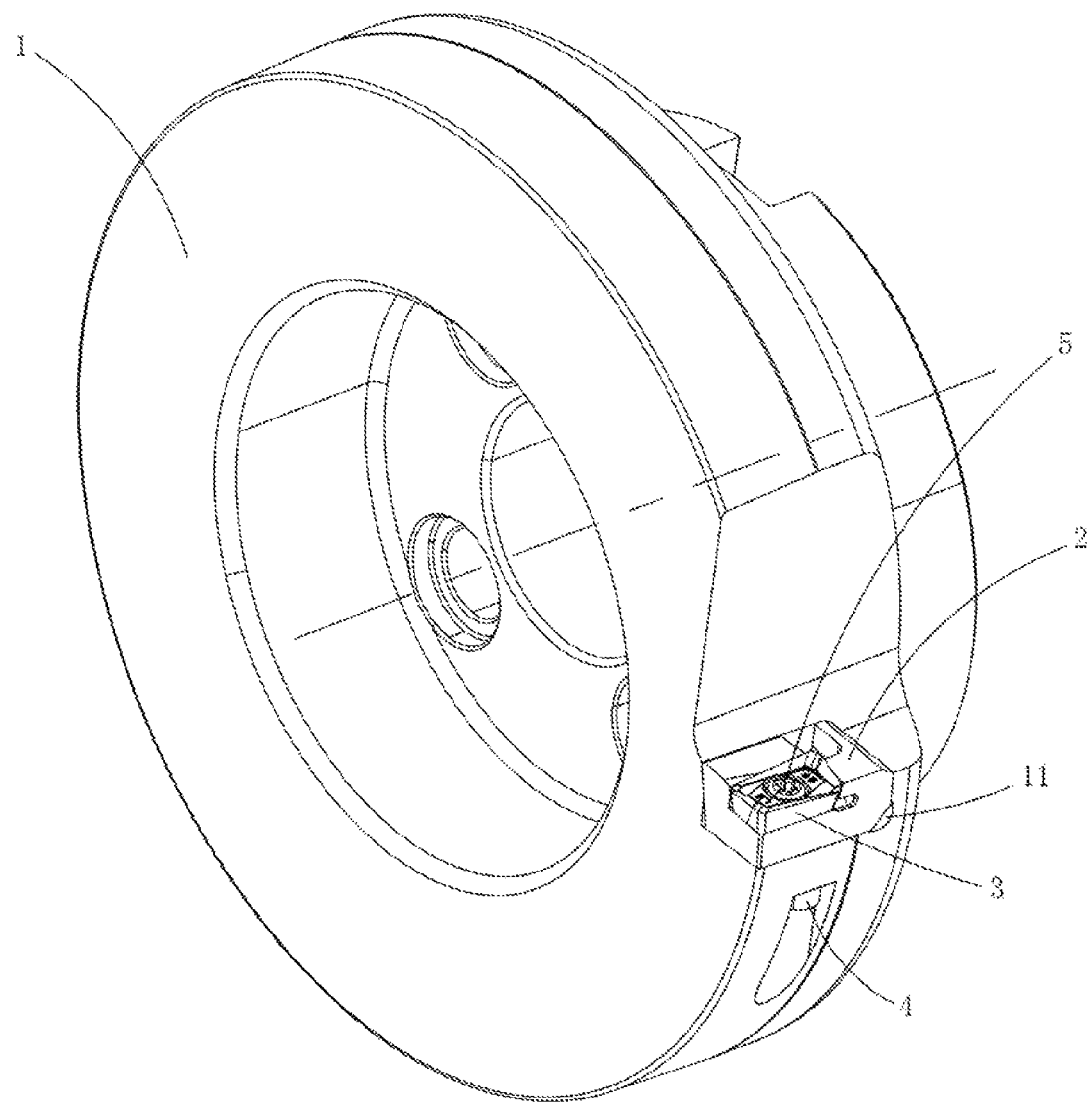
FIG. 1 is a perspective view of a conventional rotary cutting tool.
Figure 2:
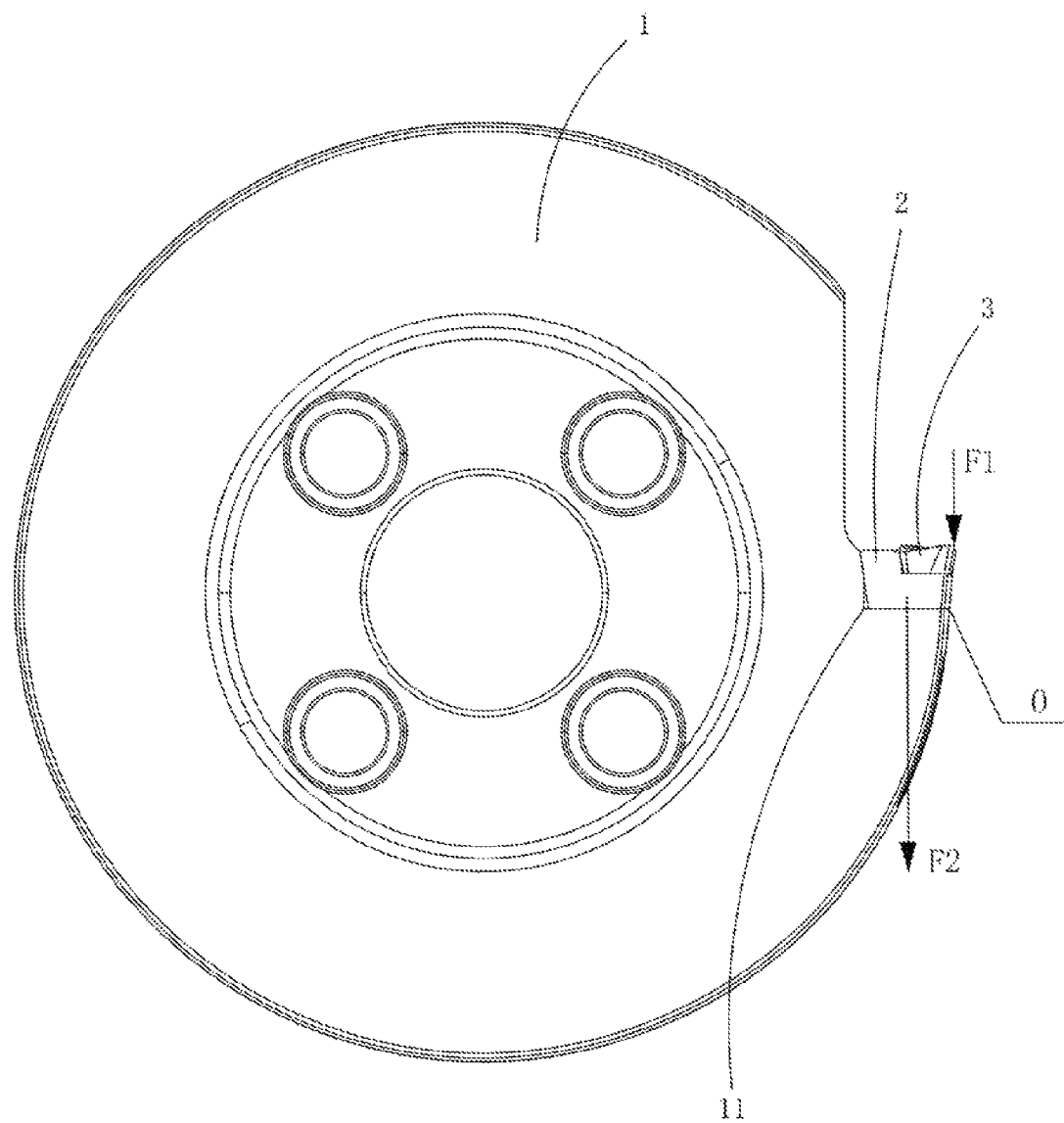
FIG. 2 is a front view of the conventional rotary cutting tool.
Figure 3:
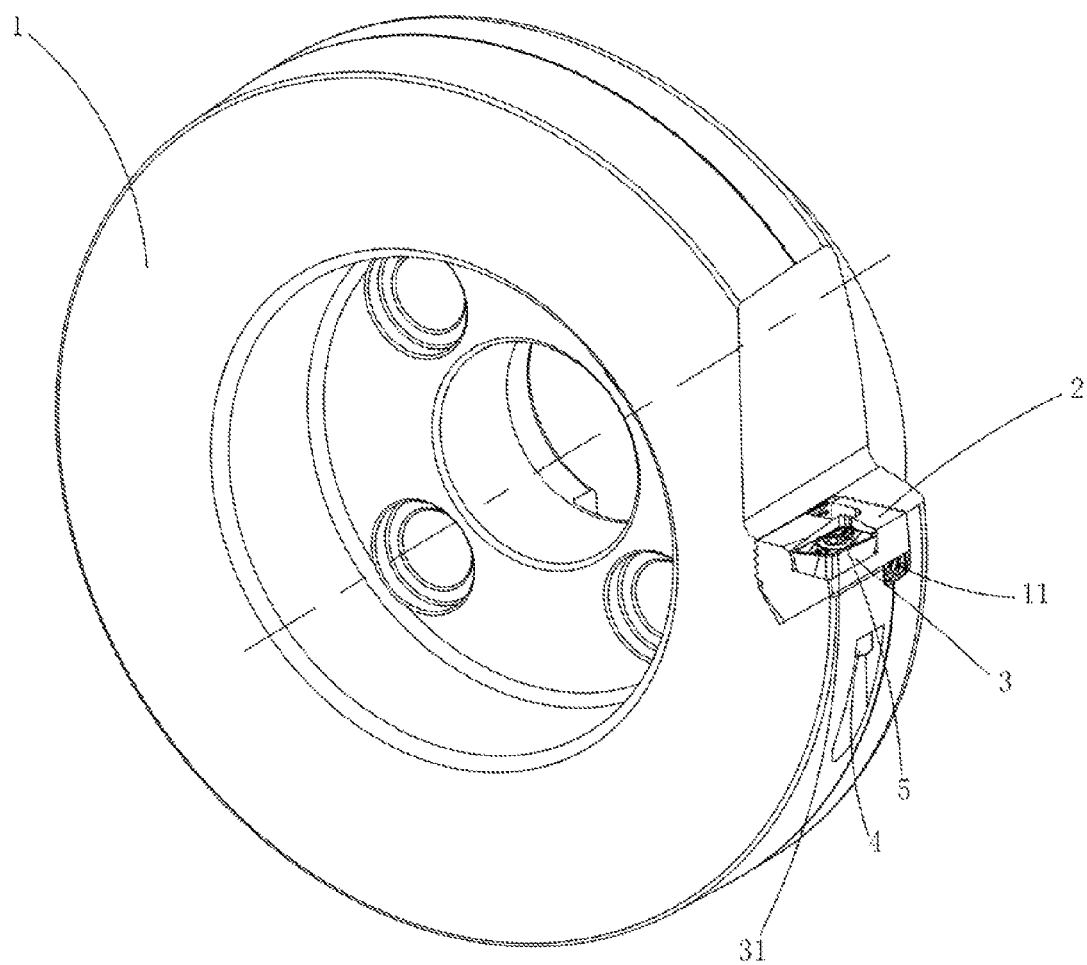
FIG. 3 is a perspective view of a rotary cutting tool according to a first preferred embodiment of the present invention.
Figure 4:
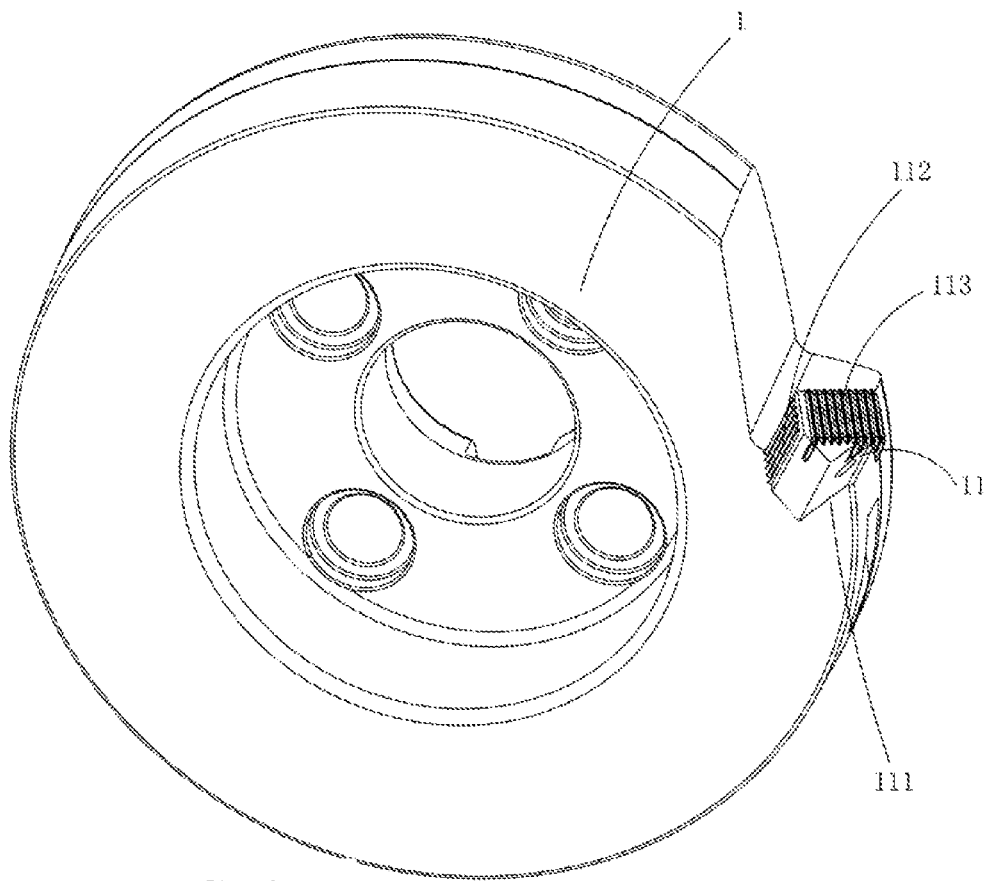
FIG. 4 is a perspective view of a rotary cutting body of the rotary cutting tool according to the above first preferred embodiment of the present invention.
Figure 5:
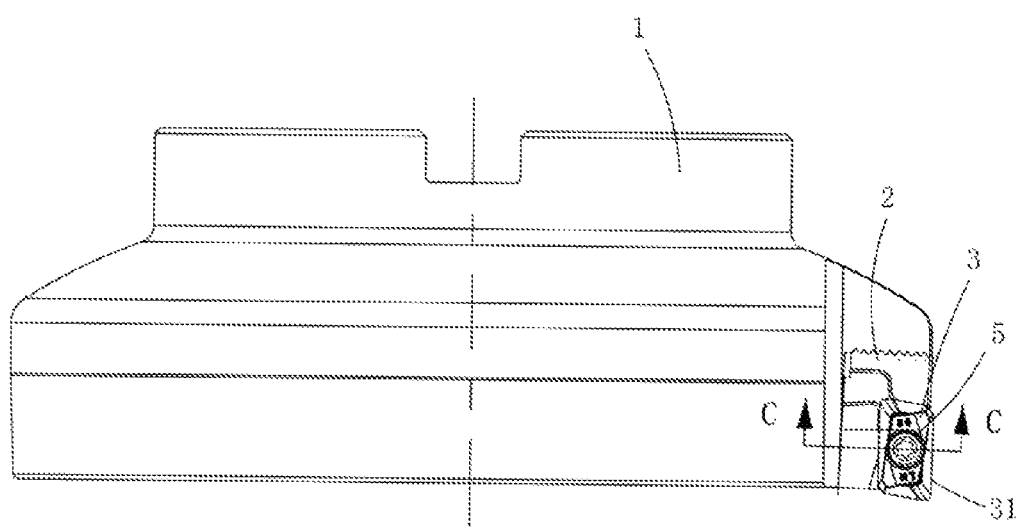
FIG. 5 is a top view of the rotary cutting tool according to the above first preferred embodiment of the present invention.
Figure 6:
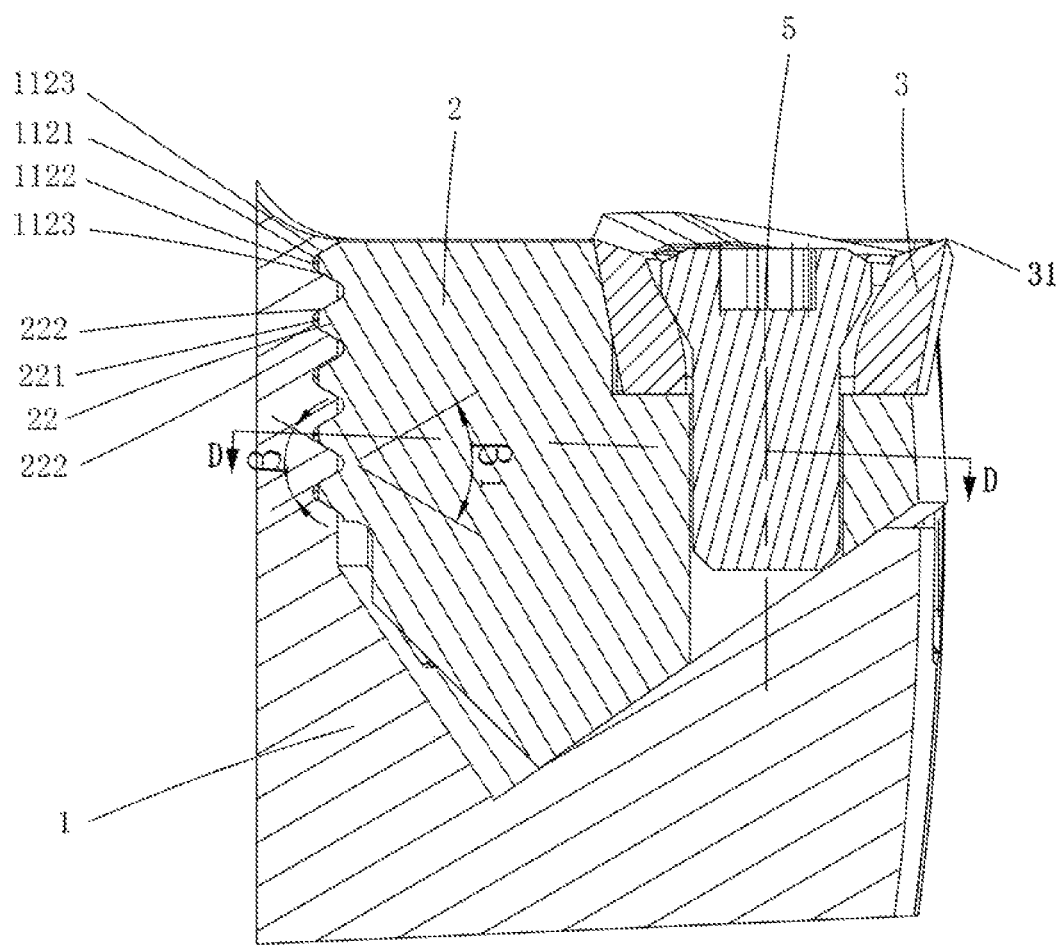
FIG. 6 is a partially sectional view of the rotary cutting tool according to the above first preferred embodiment of the present invention.
Figure 7:
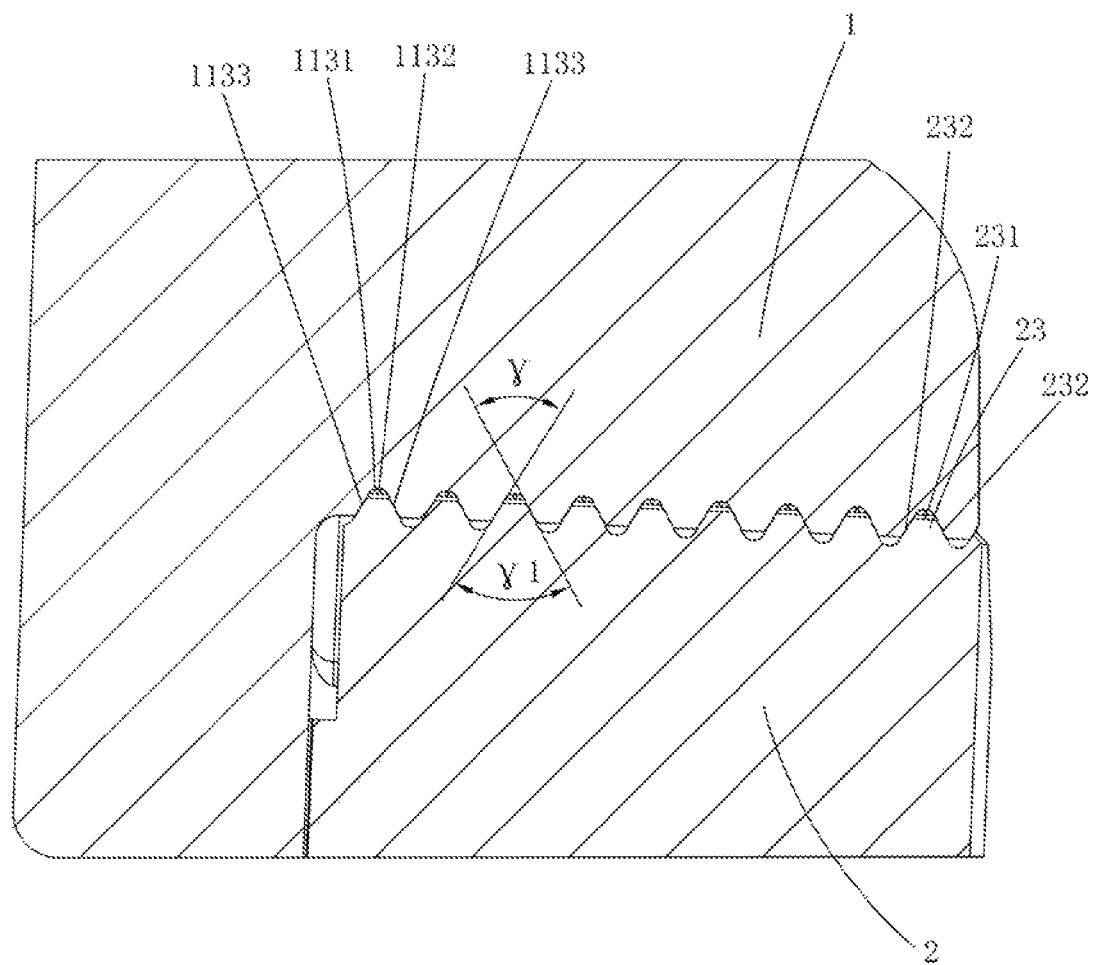
FIG. 7 is a sectional view of the rotary cutting tool according to the above first preferred embodiment of the present invention, illustrating the engagement between the rotary cutting body and the clamp.

Referring to FIGS. 3 to 7 of the drawings, a rotary cutting tool according to a first embodiment of the present invention is illustrated, wherein the rotary cutting tool comprises a rotary cutting body 1, a blade clamp 2, a cutting insert 3, a clamp fastener 4, and an insert fastener 5. The rotary cutting body 1 has an insert pocket 11 to define a bottom positioning face 111 having a V-shaped configuration, a first lateral positioning face 112, and a second lateral positioning face 113. The cutting insert 3 is affixed at the blade clamp 2 via the insert fastener 5. The first lateral positioning face 112 of the insert pocket 11 is orientated opposite to and parallel to an outer lateral cutting edge 31 of the cutting insert 3. The blade clamp 2 is slidably inserted into the insert pocket 11 of the rotary cutting body 1 along an axial direction thereof. The blade clamp 2 is retained by the first lateral positioning face 112 and the bottom positioning face 111 of the insert pocket 11 in an interference fitting (clamping) manner. Accordingly, the blade clamp 2 is securely held by the first lateral positioning face 112 and the bottom positioning face 111 of the insert pocket 11, and is also securely held by the clamp fastener 4, such that the two retention structures are combined to suspendly retain the blade clamp 2 at the insert pocket 11, so as to enable the blade clamp 2 to be only moved in the insert pocket 11 at an axial movement. Accordingly, such axial movement of the blade clamp 2 can greatly enhance the radial impact resistance of the rotary cutting tool. In particular, most of the radial impact can be transferred to the first lateral positioning face 112 and the bottom positioning face 111 of the insert pocket 11, such that the radial impart will be minimized at the clamp fastener 4, so as to prevent the distortion of the clamp fastener 4 and the connection between the clamp fastener 4 and the rotary cutting body 1. As a result, the cutting precision of the cutting insert 3 will be highly enhanced and the safety operation of the cutting insert 3 will be significantly ensured. In addition, through the retention positioning configuration, the blade clamp 2 can generate a relatively large torque to restrict any unwanted rotational movement of the blade clamp 2 at the insert pocket 11, so as to ensure the surface contact between the blade clamp 2 and the insert pocket 11. Therefore, the load at the outer connection edge between the blade clamp 2 and the insert pocket 11 can be greatly reduced to prevent the distortion or crack of the insert pocket 11 at the outer connection edge, so as to prolong the service life span of the rotary cutting tool.

According to the preferred embodiment, the rotary cutting body 1 further has at least a second guiding slot 1121 indently formed on the first lateral positioning face 112, wherein the blade clamp 2 further comprises at least a second guiding element 22 integrally protruded from a first lateral side of the blade clamp 2. Accordingly, the second guiding element 22 is engaged with the second guiding slot 1121 when the first lateral side of the blade clamp 2 is biased against the first lateral positioning face 112 to couple the blade clamp 2 at the insert pocket 11. In particular, the second guiding element 22 and the second guiding slot 1121 are extended parallel to the axial direction of the rotary cutting body 1. Accordingly, when the blade clamp 2 is slidably engaged with the insert pocket 11 at the axial direction, the second guiding slot 1121 will guide the second guiding element 22 to ensure the position of the blade clamp 2 to perpendicular to the bottom positioning face 111 of the insert pocket 11. As a result, the blade clamp 2 can be securely affixed to the rotary cutting body 1 via the clamp fastener 4 to minimize stress created at the clamp fastener 4. Such guiding configuration provides a simple and easy installation of the blade clamp 2 to accurately couple the blade clamp 2 at the rotary cutting body 1. Preferably, a plurality of spaced apart second guiding slots 1121 are indently formed on the first lateral positioning face 112, wherein a plurality of second guiding elements 22 are spacedly protruded from the first lateral side of the blade clamp 2 to engage with the second guiding slots 1121 respectively. The number of the second guiding slots 1121 matches with the number of the second guiding members 22.

According to the preferred embodiment, the rotary cutting body 1 further has at least a third guiding slot 1131 indently formed on the second lateral positioning face 113, wherein the blade clamp 2 further comprises at least a third guiding element 23 integrally protruded from a second lateral side of the blade clamp 2. Accordingly, the third guiding element 23 is engaged with the third guiding slot 1131 when the second lateral side of the blade clamp 2 is biased against the second lateral positioning face 113 to couple the blade clamp 2 at the insert pocket 11. In particular, the third guiding element 23 and the third guiding slot 1131 are extended perpendicular to the axial direction of the rotary cutting body 1.

Accordingly, when the blade clamp 2 is slidably engaged with the insert pocket 11 at the axial direction, the third guiding slot 1131 will guide the third guiding element 23 to ensure the radial position of the blade clamp 2 at the insert pocket 11. In addition, the engagement between the third guiding element 23 and the third guiding slot 1131 will withstand the centrifugal force of the blade clamp 2 to minimize the stress at the clamp fastener 4. The engagement between the third guiding element 23 and the third guiding slot 1131 will also serve as a torque resistant to minimize the load of the rotary cutting body 1. Preferably, a plurality of spaced apart third guiding slots 1131 are indently formed on the second lateral positioning face 113, wherein a plurality of third guiding elements 23 are spacedly protruded from the second lateral side of the blade clamp 2 to engage with the third guiding slots 1131 respectively. The number of the third guiding slots 1131 matches with the number of the third guiding members 23.

Accordingly, the second guiding slot 1121, having a tapered shape, defines a second slot bottom surface 1122 and two second slot lateral surfaces 1123 extended therefrom, wherein an angle between a slanted surface of the bottom positioning face 111 and the second slot lateral surface 1123 corresponding to the slanted surface of the bottom positioning face 111 is an acute angle and forms an opening facing toward the insert pocket 11, such that the blade clamp 2 is retained the insert pocket 11 in an interference fitting (clamping) manner to ensure the blade clamp 2 to be moved in an axial direction of the rotary cutting body 1 only. The second guiding element 22, having a corresponding tapered shape, defines a second guiding peak surface 221 and two second guiding lateral surfaces 222 extended therefrom to bias against the second slot lateral surfaces 1123 respectively. A third guiding angle $\beta$ is defined between the two second slot lateral surfaces 1123 of the second guiding slot 1121. A fourth guiding angle $\beta1$ is defined between the second guiding lateral surfaces 222 of the second guiding element 22. Accordingly, $30° \leq \beta \leq 160°$, $30° \leq \beta1 \leq 160°$, and $0.5° \leq \beta1 - \beta \leq 3°$. When the second guiding element 22 is engaged with the second guiding slot 1121, the second guiding peak surface 221 of the second guiding element 22 is tightly biased against the second slot bottom surface 1122 of the second guiding slot 1121 that no space is formed therebetween. In other words, when the second guiding element 22 is engaged with the second guiding slot 1121, the second guiding slot 1121 will be slightly deformed to fit the second guiding element 22, such that the deformation of the second guiding slot 1121 will generate a tightening force to ensure the blade clamp 2 to be tightly held at the insert pocket 11. When the cutting force from the cutting insert 3 is transferred as a torque at the blade clamp 2 during the cutting operation, the tightening force will restrain a portion of the torque at the blade clamp 2, so as to protect the clamp fastener 4 and to enhance the safety feature of the rotary cutting tool. The third guiding slot 1131, having a tapered shape, defines a third slot bottom surface 1132 and two third slot lateral surfaces 1133 to form an opening on the second lateral positioning face 113. The third guiding element 23, having a corresponding tapered shape, defines a third guiding peak surface 231 and two third guiding lateral surfaces 232 extended therefrom to bias against the third slot lateral surfaces 1133 respectively. A fifth guiding angle $\gamma$ is defined between the two third slot lateral surfaces 1133 of the third guiding slot 1121. A sixth guiding angle $\gamma1$ is defined between the third guiding lateral surfaces 232 of the third guiding element 23. Accordingly, $30° \leq \gamma \leq 160°$, $30° \leq \gamma1 \leq 160°$, and $0.5° \leq \gamma1 - \gamma \leq 3°$. When the third guiding element 23 is engaged with the third guiding slot 1131, the third guiding peak surface 231 of the third guiding element 23 is tightly biased against the third slot bottom surface 1132 of the third guiding slot 1131 that no space is formed therebetween. Preferably, $\beta = \gamma = 60°$, and $\beta1 = \gamma1 = 61°$. Accordingly, such tongue and groove angled engagement allows different sizes and shapes of the blade clamp 2 to be coupled at the insert pocket 11 of the rotary cutting body 1. In particular, the tongue and groove angled engagement ensures the positioning accuracy of the blade clamp 2 at the insert pocket 11 of the rotary cutting body 1. The installation of the blade clamp 2 is simple and easy via the tongue and groove angled engagement as an interference fit at two lateral sides of the blade clamp 2. Since the rigidity of the rotary cutting body 1 is weaker than that of the blade clamp 2, the elasticity of rotary cutting body 1 is better than that of the blade clamp 2. Therefore, when the blade clamp 2 is coupled at the insert pocket 11 of the rotary cutting body 1, the second and third guiding slots 1121, 1131 will be slightly deformed to fit the second and third guiding elements 22, 23 respectively, such that the deformation of the second and third guiding slots 1121, 1131 will generate the tightening forces to ensure the blade clamp 2 to be tightly held at the insert pocket 11, so as to restrain a portion of the torque at the blade clamp 2. In addition, after the cutting insert 3 is affixed to the blade clamp 2, the structural configuration between the cutting insert 3 and the blade clamp 2 is remained the same accuracy before and during the cutting operation. According to the preferred embodiment, a plurality of second and third guiding elements 22, 23 are engaged with a plurality of second and third guiding slots 1121, 1131 respectively, wherein the deformation of each of the second and third guiding slots 1121, 1131 is restricted by the neighboring second and third guiding slots 1121, 1131 to prevent the over-deformation. Therefore, it can provide adequate tightening forces to hold and retain the blade clamp 2 at the insert pocket 11 in a stable and enduring manner. It is worth mentioning that the tongue and groove angled engagement can be formed on at least one of the bottom positioning face 111, the first lateral positioning face 112, and the second lateral positioning face 113 of the insert pocket 11. Preferably, the tongue and groove angled engagement can be formed on two or more positioning faces of the insert pocket 11.

Figure 8:
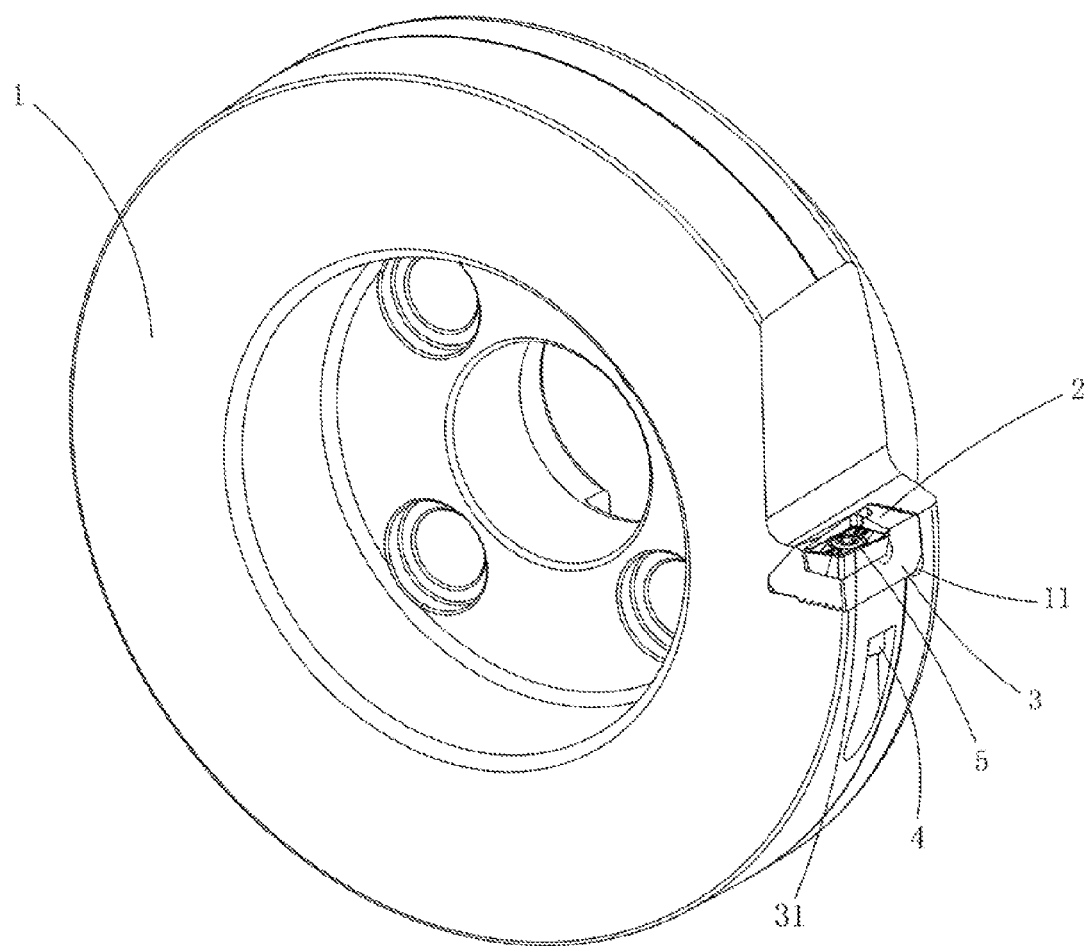
FIG. 8 is a perspective view of a rotary cutting tool according to a second preferred embodiment of the present invention.
Figure 9:
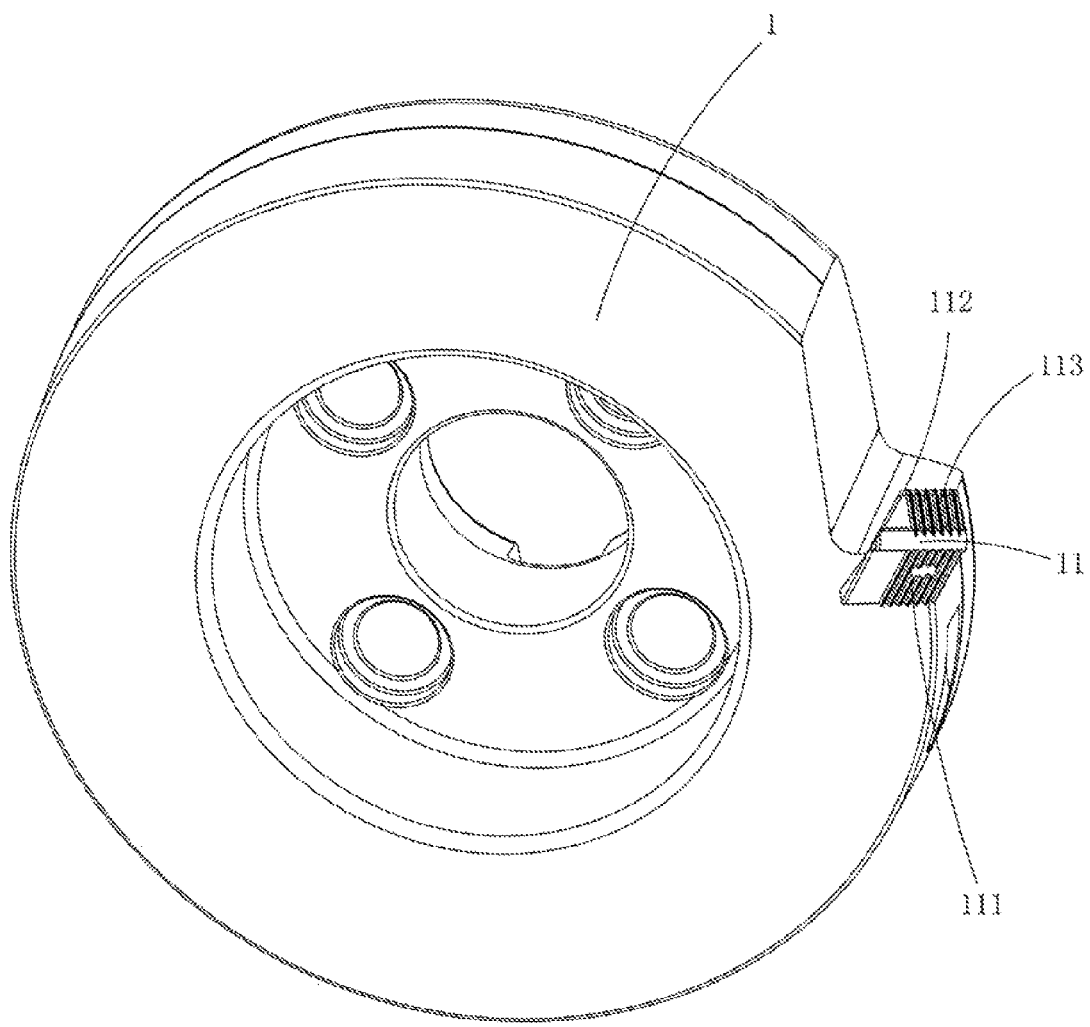
FIG. 9 is a perspective view of a rotary cutting body of the rotary cutting tool according to the above second preferred embodiment of the present invention.
Figure 10:
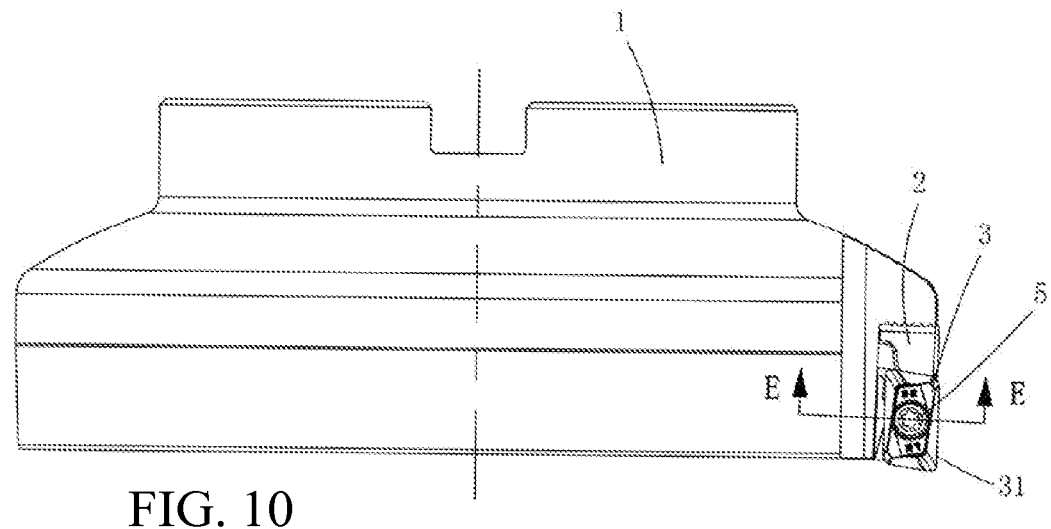
FIG. 10 is a top view of the rotary cutting tool according to the above second preferred embodiment of the present invention.
Figure 11:
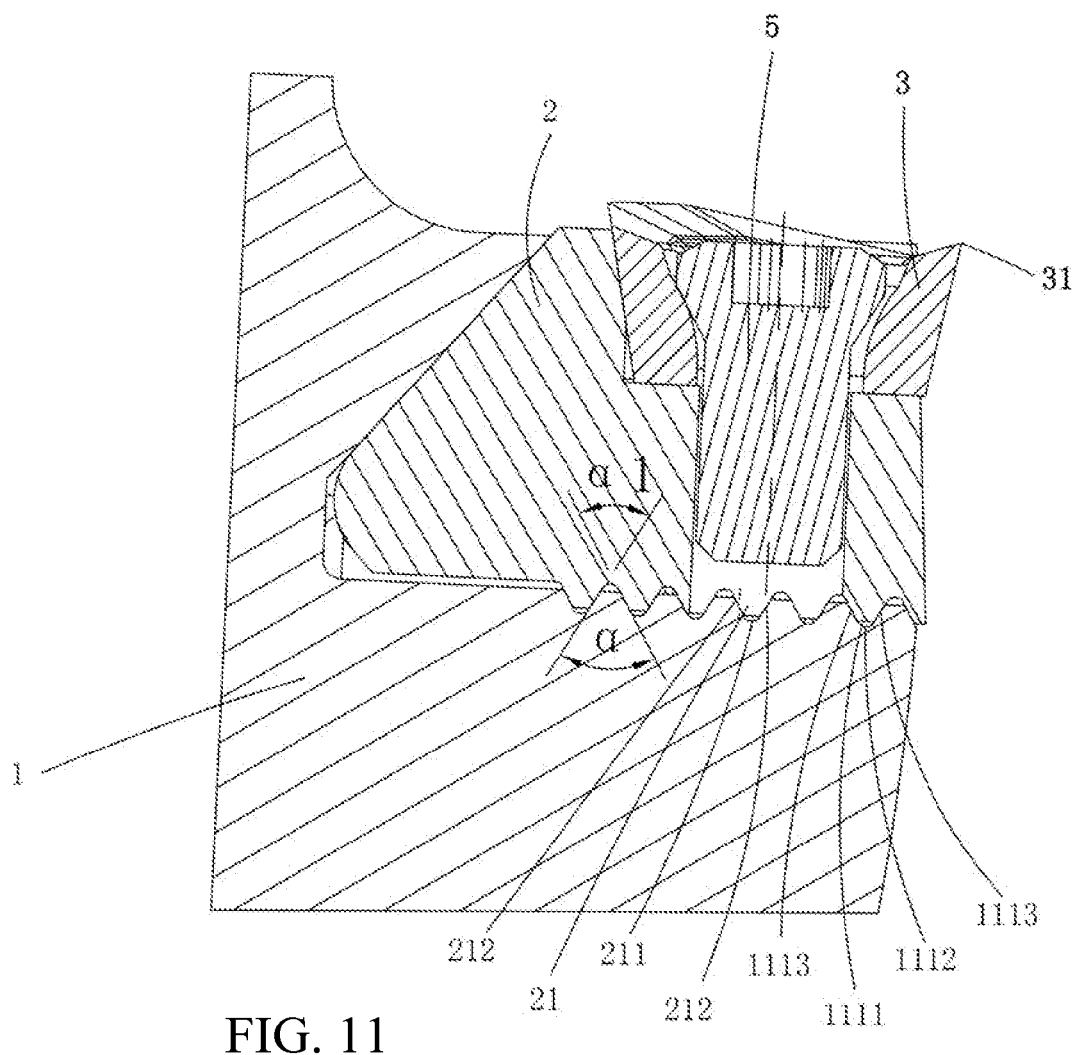
FIG. 11 is a partially sectional view of the rotary cutting tool according to the above second preferred embodiment of the present invention.

As shown in FIGS. 8 to 11, a rotary cutting tool according to a second embodiment illustrates an alternative mode of the first embodiment, wherein the rotary cutting tool of the second embodiment has the same structural configuration of the first embodiment, except the first lateral positioning face 112 is a flat smooth surface. The first lateral positioning face 112 is inclinedly extended from the bottom positioning face 111, wherein an angle between the first lateral positioning face 112 and the bottom positioning face 111 is an acute angle. In addition, the rotary cutting body 1 further has at least a first guiding slot 1111 indently formed on the bottom positioning face 111, wherein the blade clamp 2 further comprises at least a first guiding element 21 integrally protruded from a bottom side of the blade clamp 2. Accordingly, the first guiding element 21 is engaged with the first guiding slot 1111 when the bottom side of the blade clamp 2 is biased against the bottom positioning face 111 to couple the blade clamp 2 at the insert pocket 11. In particular, the first guiding element 21 and the first guiding slot 1111 are extended parallel to the axial direction of the rotary cutting body 1. Accordingly, when the blade clamp 2 is slidably engaged with the insert pocket 11 at the axial direction, the first guiding slot 1111 will guide the first guiding element 21 to ensure the position of the blade clamp 2 to perpendicular to the first lateral positioning face 112 of the insert pocket 11. As a result, the blade clamp 2 can be securely affixed to the rotary cutting body 1 via the clamp fastener 4 to minimize stress created at the clamp fastener 4. Such guiding configuration provides a simple and easy installation of the blade clamp 2 to accurately couple the blade clamp 2 at the rotary cutting body 1. In addition, the engagement between the first guiding element 21 and the first guiding slot 1111 will withstand the centrifugal force of the blade clamp 2 to minimize the stress at the clamp fastener 4, so as to prolong the service life span of the clamp fastener 4. Preferably, a plurality of spaced apart first guiding slots 1111 are indently formed on the bottom positioning face 111, wherein a plurality of first guiding elements 21 are spacedly protruded from the bottom side of the blade clamp 2 to engage with the first guiding slots 1111 respectively. The number of the first guiding slots 1111 matches with the number of the first guiding members 21, wherein the deformation of each of the first guiding slots 1111 is restricted by the neighboring first guiding slots 1111 to prevent the over-deformation. Therefore, it can provide adequate tightening forces to hold and retain the blade clamp 2 at the insert pocket 11 in a stable and enduring manner.

According to the second embodiment, the first guiding slot 1111, having a tapered shape, defines a first slot bottom surface 1112 and two first slot lateral surfaces 1113 extended therefrom, wherein an angle between a slanted surface of the first lateral positioning face 112 and the first slot lateral surface 1113 corresponding to the slanted surface of the first lateral positioning face 112 is an acute angle and forms an opening facing toward the insert pocket 11, such that the blade clamp 2 is retained the insert pocket 11 in an interference fitting (clamping) manner to ensure the blade clamp 2 to be moved in an axial direction of the rotary cutting body 1 only. The first guiding element 21, having a corresponding tapered shape, defines a first guiding peak surface 211 and two first guiding lateral surfaces 212 extended therefrom to bias against the first slot lateral surfaces 1113 respectively. A first guiding angle $\alpha$ is defined between the two first slot lateral surfaces 1113 of the first guiding slot 1111. A second guiding angle $\alpha1$ is defined between the first guiding lateral surfaces 212 of the first guiding element 21. Accordingly, $30° \leq \alpha \leq 160°$, $30° \leq \alpha1 \leq 160°$, and $0.5° \leq \alpha1 - \alpha \leq 3°$. When the first guiding element 21 is engaged with the first guiding slot 1111, the first guiding peak surface 211 of the first guiding element 21 is tightly biased against the first slot bottom surface 1112 of the first guiding slot 1111 that no space is formed therebetween. Preferably, $\alpha=60°$, and $\alpha1=61°$.

The structural configurations of third guiding slot 1131 and the third guiding element 23 according to the second embodiment are the same as the structural configurations of the first embodiment.

Figure 12:
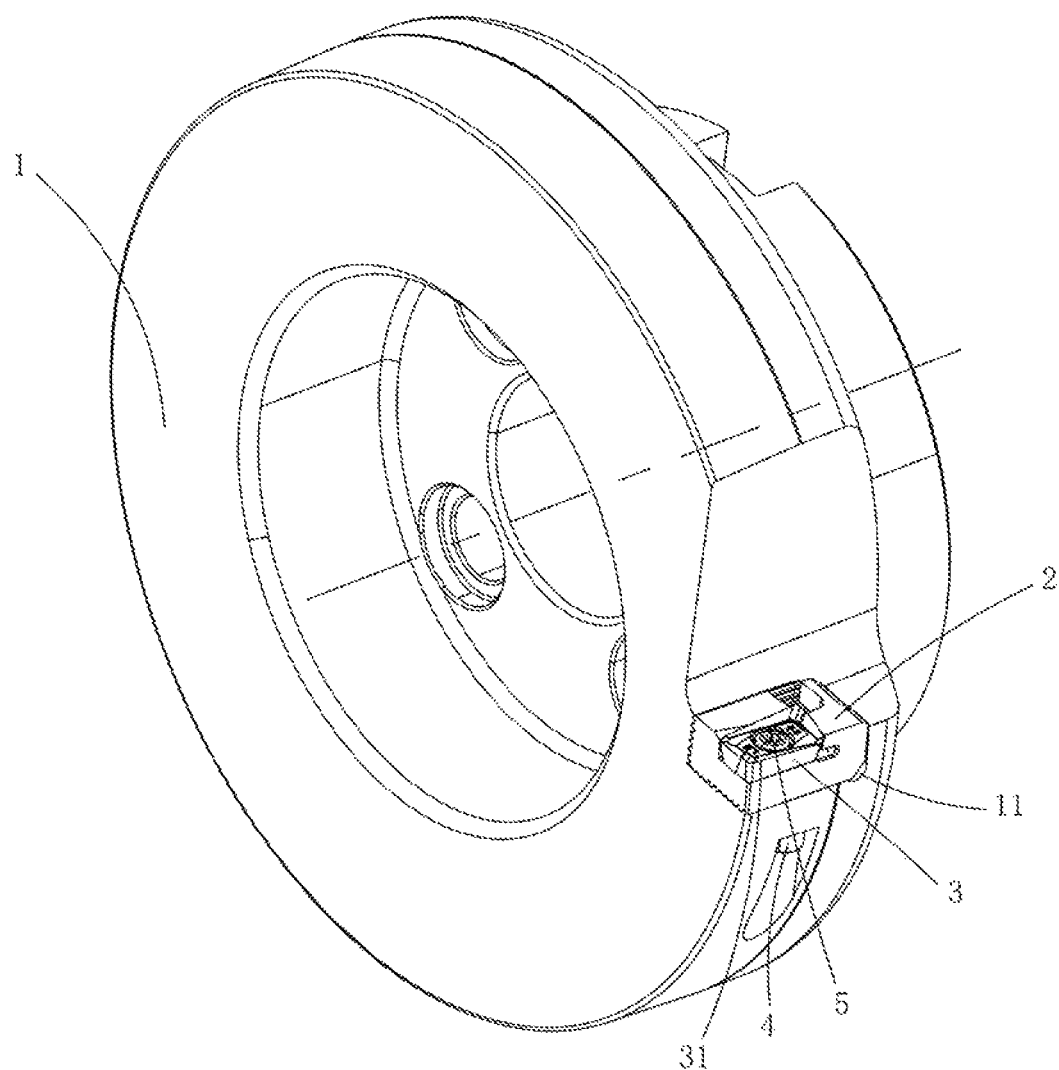
FIG. 12 is a perspective view of a rotary cutting tool according to a third preferred embodiment of the present invention.
Figure 13:
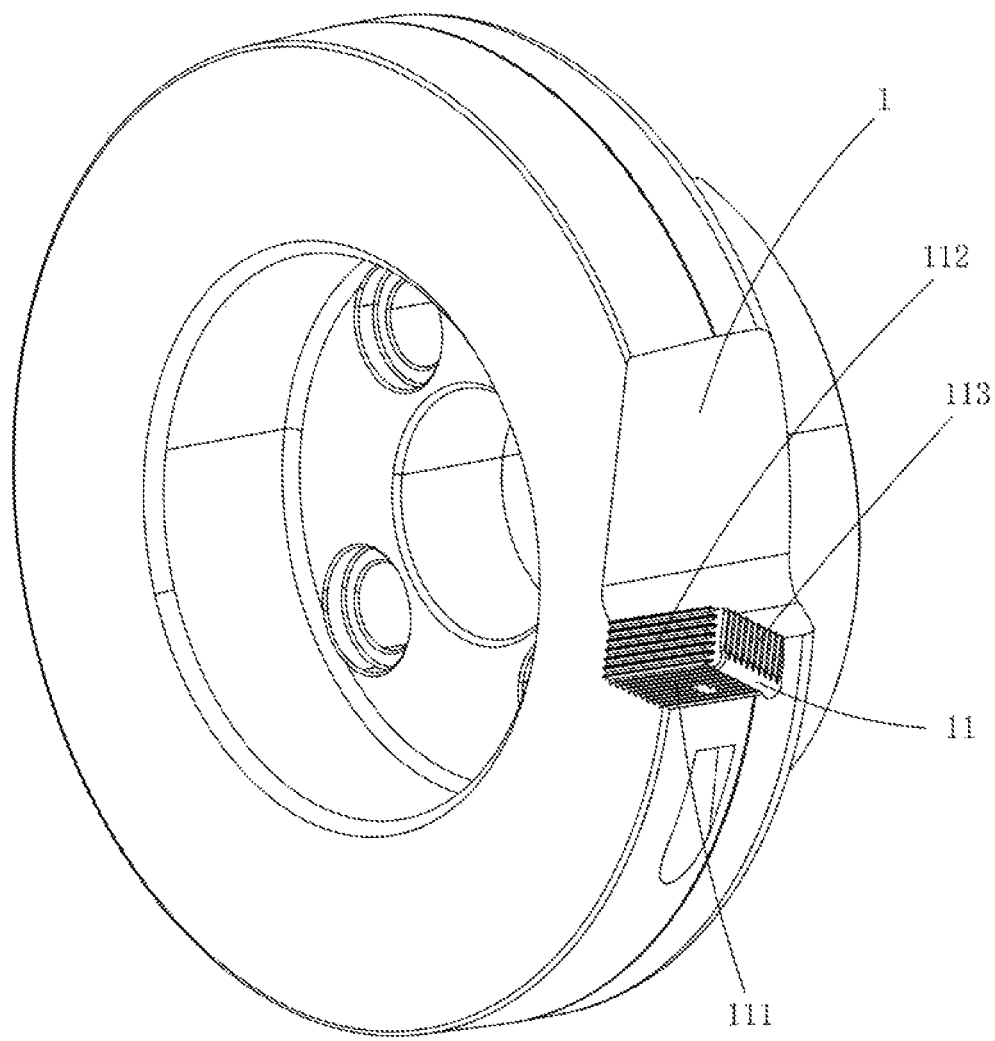
FIG. 13 is a perspective view of a rotary cutting body of the rotary cutting tool according to the above third preferred embodiment of the present invention.
Figure 14:
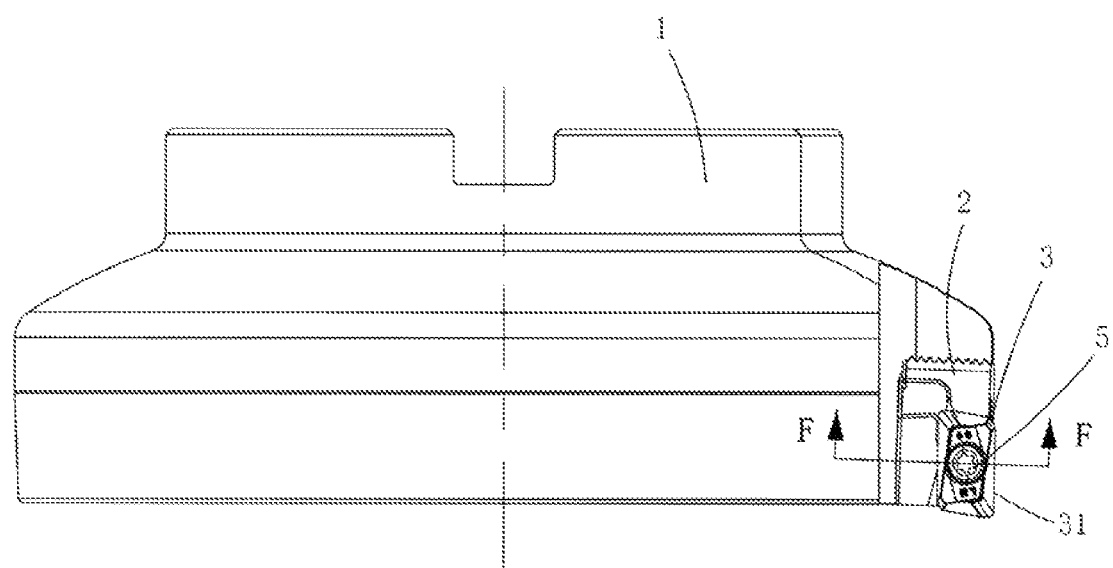
FIG. 14 is a top view of the rotary cutting tool according to the above third preferred embodiment of the present invention.
Figure 15:
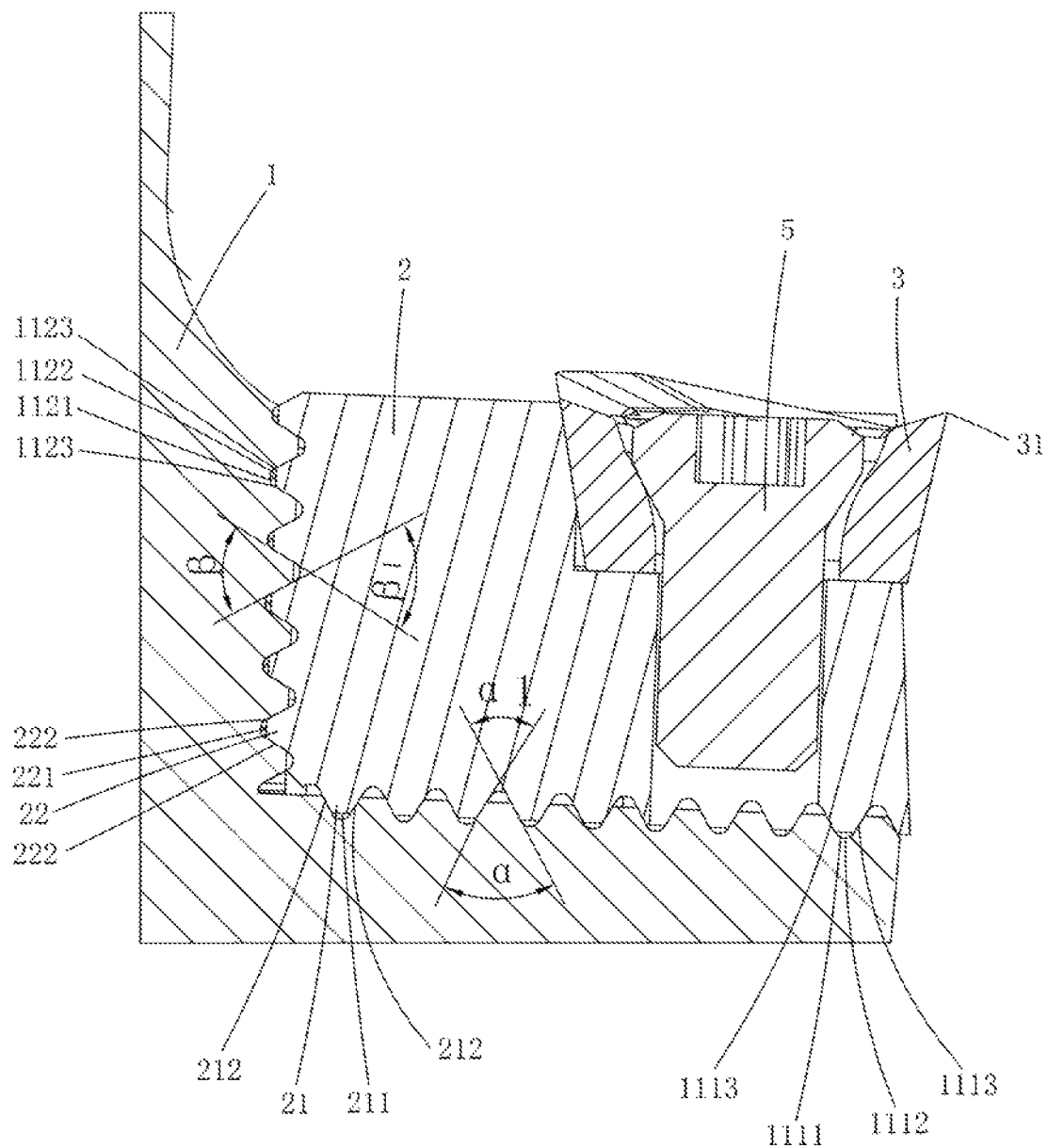
FIG. 15 is a partially sectional view of the rotary cutting tool according to the above third preferred embodiment of the present invention.

As shown in FIGS. 12 to 15, a rotary cutting tool according to a third embodiment illustrates an alternative mode of the first and second embodiments, wherein the rotary cutting tool of the third embodiment has the same structural configuration of the first and second embodiments. According to the third embodiment, the rotary cutting body 1 further has at least a first guiding slot 1111 indently formed on the bottom positioning face 111, wherein the blade clamp 2 further comprises at least a first guiding element 21 integrally protruded from a bottom side of the blade clamp 2. Accordingly, the first guiding element 21 is engaged with the first guiding slot 1111 when the bottom side of the blade clamp 2 is biased against the bottom positioning face 111 to couple the blade clamp 2 at the insert pocket 11. In particular, the first guiding element 21 and the first guiding slot 1111 are extended parallel to the axial direction of the rotary cutting body 1. The rotary cutting body 1 further has at least a second guiding slot 1121 indently formed on the first lateral positioning face 112, wherein the blade clamp 2 further comprises at least a second guiding element 22 integrally protruded from a first lateral side of the blade clamp 2. Accordingly, the second guiding element 22 is engaged with the second guiding slot 1121 when the first lateral side of the blade clamp 2 is biased against the first lateral positioning face 112 to couple the blade clamp 2 at the insert pocket 11. In particular, the second guiding element 22 and the second guiding slot 1121 are extended parallel to the axial direction of the rotary cutting body 1. In other words, when the blade clamp 2 is slidably engaged with the insert pocket 11 at the axial direction, the first guiding element 21 is engaged with the first guiding slot 1111 while the second guiding element 22 is engaged with the second guiding slot 1121 to ensure the position of the blade clamp 2 to perpendicular to the bottom positioning face 111 of the insert pocket 11. As a result, the blade clamp 2 can be securely affixed to the rotary cutting body 1 via the clamp fastener 4 to minimize stress created at the clamp fastener 4. Such guiding configuration provides a simple and easy installation of the blade clamp 2 to accurately couple the blade clamp 2 at the rotary cutting body 1.

According to the third embodiment, the first guiding slot 1111, having a tapered shape, defines a first slot bottom surface 1112 and two first slot lateral surfaces 1113 extended therefrom, wherein an angle between a slanted surface of the first lateral positioning face 112 and the first slot lateral surface 1113 corresponding to the slanted surface of the first lateral positioning face 112 is an acute angle and forms an opening facing toward the insert pocket 11, such that the blade clamp 2 is retained the insert pocket 11 in an interference fitting (clamping) manner to ensure the blade clamp 2 to be moved in an axial direction of the rotary cutting body 1 only. The first guiding element 21, having a corresponding tapered shape, defines a first guiding peak surface 211 and two first guiding lateral surfaces 212 extended therefrom to bias against the first slot lateral surfaces 1113 respectively. A first guiding angle $\alpha$ is defined between the two first slot lateral surfaces 1113 of the first guiding slot 1111. A second guiding angle $\alpha1$ is defined between the first guiding lateral surfaces 212 of the first guiding element 21. Accordingly, $30° \leq \alpha \leq 160°$, $30° \leq \alpha1 \leq 160°$, and $0.5° \leq \alpha1 - \alpha \leq 3°$. The second guiding element 22, having a corresponding tapered shape, defines a second guiding peak surface 221 and two second guiding lateral surfaces 222 extended therefrom to bias against the second slot lateral surfaces 1123 respectively. A third guiding angle $\beta$ is defined between the two second slot lateral surfaces 1123 of the second guiding slot 1121. A fourth guiding angle $\beta1$ is defined between the second guiding lateral surfaces 222 of the second guiding element 22. Accordingly, $30° \leq \beta \leq 160°$, $30° \leq \beta1 \leq 160°$, and $0.5° \beta1 - \beta \leq 3°$. Preferably, $\alpha=\beta=60°$, and $\alpha1=\beta1=61°$. When the first guiding element 21 is engaged with the first guiding slot 1111, the first guiding peak surface 211 of the first guiding element 21 is tightly biased against the first slot bottom surface 1112 of the first guiding slot 1111 that no space is formed therebetween. When the second guiding element 22 is engaged with the second guiding slot 1121, the second guiding peak surface 221 of the second guiding element 22 is tightly biased against the second slot bottom surface 1122 of the second guiding slot 1121 that no space is formed therebetween. The number of the first guiding slots 1111 matches with the number of the first guiding members 21 and the number of the second guiding slots 1121 matches with the number of the second guiding members 22, wherein the deformation of each of the first and second guiding slots 1111, 1121 is restricted by the neighboring first and second guiding slots 1111, 1121 to prevent the over-deformation. Therefore, it can provide adequate tightening forces to hold and retain the blade clamp 2 at the insert pocket 11 in a stable and enduring manner.

The structural configurations of third guiding slot 1131 and the third guiding element 23 according to the third embodiment are the same as the structural configurations of the first and second embodiments.

Accordingly, the attachment of the cutting insert 3 to the blade clamp 2 via the insert fastener 5 can be any attachment. Preferably, the cutting insert 3 can be detachably attached to the blade clamp 2 via the insert fastener 5.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rotary cutting tool, comprising a rotary tool body, a blade clamp, a cutting insert, a clamp fastener, and a blade fastener, wherein said rotary tool body has an insert pocket to define a bottom positioning face, a first lateral positioning face and a second lateral positioning face, wherein said cutting insert is affixed to said blade clamp via said blade fastener, wherein said first lateral positioning face is orientated opposite and parallel to an outer lateral cutting edge of said cutting insert, wherein said blade clamp is slid into the insert pocket in an axial direction of said rotary tool body, wherein said blade clamp is coupled by said first lateral positioning face and second lateral positioning face in an interference fitting manner and is affixed at said rotary tool body by said rotary clamp fastener.

2. The rotary cutting tool, as recited in claim 1, wherein said rotary cutting body further has at least a second guiding slot indently formed on said first lateral positioning face, wherein said blade clamp further comprises at least a second guiding element integrally protruded from a first lateral side of said blade clamp to engage with said second guiding slot, wherein said second guiding element and said second guiding slot are extended parallel to said axial direction of said rotary cutting body.

3. The rotary cutting tool, as recited in claim 2, wherein said second guiding slot, having a tapered shape, defines a second slot bottom surface and two second slot lateral surfaces extended therefrom, wherein said blade clamp is retained said insert pocket between said bottom positioning face and said second slot lateral surface in an interference fitting manner.

4. The rotary cutting tool, as recited in claim 3, wherein said second guiding element, having a corresponding tapered shape, defines a second guiding peak surface and two second guiding lateral surfaces extended therefrom, wherein a third guiding angle $\beta$ is defined between said two second slot lateral surfaces of said second guiding slot, and a fourth guiding angle $\beta 1$ is defined between said second guiding lateral surfaces of said second guiding element, wherein $30° \leq \beta \leq 160°$, $30° \leq \beta 1 \leq 160°$, and $0.5° \leq \beta 1 - \beta \leq 3°$.

5. The rotary cutting tool, as recited in claim 4, wherein when said second guiding element is engaged with said second guiding slot, said second guiding peak surface of said second guiding element is tightly biased against said second slot bottom surface of said second guiding slot that no space is formed therebetween.

6. The rotary cutting tool, as recited in claim 1, wherein said rotary cutting body further has at least a first guiding slot indently formed on said bottom positioning face, wherein said blade clamp further comprises at least a first guiding element integrally protruded from a bottom side of said blade clamp to engage with said first guiding slot, wherein said first guiding element and said first guiding slot are extended parallel to said axial direction of said rotary cutting body.

7. The rotary cutting tool, as recited in claim 6, wherein said first guiding slot, having a tapered shape, defines a first slot bottom surface and two first slot lateral surfaces extended therefrom, wherein said blade clamp is retained the insert pocket between said first lateral positioning face and said first slot lateral surface in an interference fitting manner.

8. The rotary cutting tool, as recited in claim 7, wherein said first guiding element, having a corresponding tapered shape, defines a first guiding peak surface and two first guiding lateral surfaces extended therefrom, wherein a first guiding angle $\alpha$ is defined between said two first slot lateral surfaces of said first guiding slot and a second guiding angle $\alpha 1$ is defined between said first guiding lateral surfaces of said first guiding element, wherein $30° \leq \alpha \leq 160°$, $30° \leq \alpha 1 \leq 160°$, and $0.5° \leq \alpha 1 - \alpha \leq 3°$.

9. The rotary cutting tool, as recited in claim 8, wherein when said first guiding element is engaged with said first guiding slot, said first guiding peak surface of said first guiding element is tightly biased against said first slot bottom surface of said first guiding slot that no space is formed therebetween.

10. The rotary cutting tool, as recited in claim 1, wherein said rotary cutting body further has at least a first guiding slot indently formed on said bottom positioning face, wherein said blade clamp further comprises at least a first guiding element integrally protruded from a bottom side of said blade clamp to engage with said first guiding slot, wherein said first guiding element and said first guiding slot are extended parallel to said axial direction of said rotary cutting body, wherein said rotary cutting body further has at least a second guiding slot indently formed on said first lateral positioning face, wherein said blade clamp further comprises at least a second guiding element integrally protruded from a first lateral side of said blade clamp to engage with said second guiding slot, wherein said second guiding element and the second guiding slot are extended parallel to said axial direction of said rotary cutting body.

11. The rotary cutting tool, as recited in claim 10, wherein said first guiding slot, having a tapered shape, defines a first slot bottom surface and two first slot lateral surfaces extended therefrom, wherein said second guiding slot, having a tapered shape, defines a second slot bottom surface and two second slot lateral surfaces extended therefrom, wherein said blade clamp is retained the insert pocket between the first slot lateral surface and said second slot lateral surface in an interference fitting manner.

12. The rotary cutting tool, as recited in claim 11, wherein said first guiding element, having a corresponding tapered shape, defines a first guiding peak surface and two first guiding lateral surfaces extended therefrom, wherein a first guiding angle α is defined between said two first slot lateral surfaces of said first guiding slot and a second guiding angle α1 is defined between said first guiding lateral surfaces of said first guiding element, wherein $30°≤α≤160°$, $30°≤α1≤160°$, and $0.5°≤α1-α≤3°$, wherein said second guiding element, having a corresponding tapered shape, defines a second guiding peak surface and two second guiding lateral surfaces extended therefrom, wherein a third guiding angle β is defined between said two second slot lateral surfaces of said second guiding slot and a fourth guiding angle β1 is defined between said second guiding lateral surfaces of said second guiding element, wherein $30°≤β≤160°$, $30°≤β1≤160°$, and $0.5°≤β1-β≤3°$.

13. The rotary cutting tool, as recited in claim 12, wherein when said first guiding element is engaged with said first guiding slot, said first guiding peak surface of said first guiding element is tightly biased against said first slot bottom surface of said first guiding slot that no space is formed therebetween, wherein when said second guiding element is engaged with said second guiding slot, said second guiding peak surface of said second guiding element is tightly biased against said second slot bottom surface of said second guiding slot that no space is formed therebetween.

14. The rotary cutting tool, as recited in claim 1, wherein said rotary cutting body further has at least a third guiding slot indently formed on said second lateral positioning face, wherein said blade clamp further comprises at least a third guiding element integrally protruded from a second lateral side of said blade clamp to engage with said third guiding slot.

15. The rotary cutting tool, as recited in claim 14, wherein said third guiding slot, having a tapered shape, defines a third slot bottom surface and two third slot lateral surfaces extended therefrom, wherein said third guiding element, having a corresponding tapered shape, defines a third guiding peak surface and two third guiding lateral surfaces extended therefrom, wherein a fifth guiding angle γ is defined between said two third slot lateral surfaces of said third guiding slot and a sixth guiding angle γ1 is defined between said third guiding lateral surfaces of said third guiding element, wherein $30°≤γ≤160°$, $30°≤γ1≤160°$, and $0.5°≤γ1-γ≤3°$.

16. The rotary cutting tool, as recited in claim 15, wherein when said third guiding element is engaged with said third guiding slot, said third guiding peak surface of said third guiding element is tightly biased against third slot bottom surface of third guiding slot that no space is formed therebetween.

17. The rotary cutting tool, as recited in claim 9, wherein said rotary cutting body further has at least a third guiding slot indently formed on said second lateral positioning face, wherein said blade clamp further comprises at least a third guiding element integrally protruded from a second lateral side of said blade clamp to engage with said third guiding slot.

18. The rotary cutting tool, as recited in claim 17, wherein said third guiding slot, having a tapered shape, defines a third slot bottom surface and two third slot lateral surfaces extended therefrom, wherein said third guiding element, having a corresponding tapered shape, defines a third guiding peak surface and two third guiding lateral surfaces extended therefrom, wherein a fifth guiding angle γ is defined between said two third slot lateral surfaces of said third guiding slot and a sixth guiding angle γ1 is defined between said third guiding lateral surfaces of said third guiding element, wherein $30°≤γ≤160°$, $30°≤γ1≤160°$, and $0.5°≤γ1-γ≤3°$, wherein when said third guiding element is engaged with said third guiding slot, said third guiding peak surface of said third guiding element is tightly biased against third slot bottom surface of third guiding slot that no space is formed therebetween.

19. The rotary cutting tool, as recited in claim 13, wherein said rotary cutting body further has at least a third guiding slot indently formed on said second lateral positioning face, wherein said blade clamp further comprises at least a third guiding element integrally protruded from a second lateral side of said blade clamp to engage with said third guiding slot.

20. The rotary cutting tool, as recited in claim 19, wherein said third guiding slot, having a tapered shape, defines a third slot bottom surface and two third slot lateral surfaces extended therefrom, wherein said third guiding element, having a corresponding tapered shape, defines a third guiding peak surface and two third guiding lateral surfaces extended therefrom, wherein a fifth guiding angle γ is defined between said two third slot lateral surfaces of said third guiding slot and a sixth guiding angle γ1 is defined between said third guiding lateral surfaces of said third guiding element, wherein $30°≤γ≤160°$, $30°≤γ1≤160°$, and $0.5°≤γ1-γ≤3°$, wherein when said third guiding element is engaged with said third guiding slot, said third guiding peak surface of said third guiding element is tightly biased against third slot bottom surface of third guiding slot that no space is formed therebetween.

\* \* \* \* \*